(12) United States Patent
Kurth

(10) Patent No.: US 7,269,172 B2
(45) Date of Patent: Sep. 11, 2007

(54) METHOD AND DEVICE FOR MANAGING TRANSMIT BUFFERS

(75) Inventor: Hugh R. Kurth, Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1021 days.

(21) Appl. No.: 10/337,603

(22) Filed: Jan. 7, 2003

(65) Prior Publication Data

US 2004/0131074 A1    Jul. 8, 2004

(51) Int. Cl.
*H04L 12/56* (2006.01)
*G06F 11/00* (2006.01)

(52) U.S. Cl. .............. 370/392; 370/394; 370/412; 714/18; 714/748

(58) Field of Classification Search ............ None
See application file for complete search history.

(56) References Cited

U.S. PATENT DOCUMENTS

| | | | |
|---|---|---|---|
| 5,790,535 A * | 8/1998 | Kou | 370/337 |
| 6,072,741 A * | 6/2000 | Taylor | 365/219 |
| 7,003,710 B2 * | 2/2006 | Tomaru et al. | 714/751 |
| 7,190,669 B2 | 3/2007 | Banerjee | |
| 7,197,566 B1 | 3/2007 | Kuzma | |
| 7,197,582 B2 | 3/2007 | Chelcea et al. | |

* cited by examiner

*Primary Examiner*—Chi Pham
*Assistant Examiner*—Soon D. Hyun
(74) *Attorney, Agent, or Firm*—Meyertons Hood Kivlin Kowert & Goetzel, P.C.; B. Noël Kivlin

(57) ABSTRACT

A method and device for managing a data buffer that stores packets for transmission. Packets are loaded into the data buffer, which is managed as a first-in-first-out (FIFO) circular queue, at the tail of the queue. Three sequence numbers index a pointer array addressing the buffer. These sequence numbers correspond to the tail of the queue, the point in the queue from which the next packet is to be transmitted and the head of the queue, corresponding to the last packet acknowledged as correctly received plus one. When a packet is negatively acknowledged, the sequence number corresponding to the next packet to be transmitted is reset to the head of the queue.

15 Claims, 5 Drawing Sheets

PRIOR ART    Fig. 1

METHOD AND DEVICE FOR MANAGING TRANSMIT BUFFERS

TECHNICAL FIELD AND BACKGROUND ART

The present invention relates to methods and devices for managing data buffers used for packets awaiting transmission on a communication link.

Since the error rate on most communication systems is non-zero, many systems employ a retransmission protocol to reduce the effective error rate. As shown in FIG. 1, data that is transmitted from a transmit buffer 5 is typically then stored in a retransmit buffer 10 until reception of the data is acknowledged. If the data is received correctly, a positive acknowledgement is returned to the transmitter from the receiver. The retransmit buffer can then be freed. If the data is received in error, a negative acknowledgement is returned to the transmitter and the data is then retransmitted 15. This approach is inefficient, requiring a separate retransmit buffer and a copy operation to save transmitted data in the retransmit buffer until the data is positively acknowledged.

SUMMARY OF THE INVENTION

In an embodiment of the present invention, a method is provided for managing data buffers storing data for transmission on a communication link. The data buffer may be organized as a circular, first-in-first-out ("FIFO") queue. A pointer array contains addresses each pointing to a pocket of data in the buffer. Three sequence numbers index the pointer array. These sequence numbers are: a load sequence number, a transmit sequence number and a retransmit sequence number. Packet data is loaded into the next available location in the data buffer, if space is available. Space is available in the buffer if the pointer array entry corresponding to the retransmit sequence number does not point to the next location to be loaded. Loading continues until the complete packet is loaded into the buffer and the load sequence number is then incremented. The pointer at the load sequence number is loaded with the address of the next location in the buffer.

A packet is ready for transmission when the transmit sequence number and the load sequence number are unequal. Packets are transmitted from the buffer at the pointer array entry corresponding to the transmit sequence number, which sequence number is then incremented so as to index the address of the next packet in the data buffer. When a positive acknowledgement is received, the retransmit sequence number is updated so as to index the pointer to the next packet and the corresponding data buffer area of the acknowledged packet is thereby made available for loading additional packets into the buffer. If a negative acknowledgment is received, the transmit sequence number is reset to the retransmit sequence number, causing the packet received in error and subsequent transmitted packets to be retransmitted. This embodiment of the invention allows a single data buffer to contain packets waiting to be transmitted and packets waiting to be acknowledged, advantageously avoiding copying transmitted packets to a separate retransmit buffer.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

In an embodiment of the present invention, a method is provided for managing data buffers storing data for transmission on a communication link. The data buffer stores data packets awaiting transmission or retransmission. The data buffer may be organized as a first-in-first-out ("FIFO") circular queue. The packets in the data buffer vary in length. A pointer array contains addresses each pointing to a packet in the buffer. Typically, each pointer array entry will indicate the first address of a packet in the data buffer. The pointer array entries are in sequence identifying each packet in the data buffer one after the other.

Sequence numbers index the pointer array. These sequence numbers are: a load sequence number, a transmit sequence number and a retransmit sequence number. The load sequence number identifies the pointer array entry with the address of the next free memory location in the data buffer, if space is available. The transmit sequence number identifies the pointer array entry with the address of the next packet to be transmitted. The retransmit sequence number identifies the pointer array entry with the oldest transmitted packet awaiting acknowledgement The load sequence number, the transmit sequence number and the retransmit sequence number are revised as data packets are loaded, transmitted and acknowledged respectively. This embodiment of the invention may be used to manage data buffers for storing data for transmission over a communication link. The communication link may be a point-to-point connection, a link over a network or other architecture providing communication between two modes.

Figure 1:
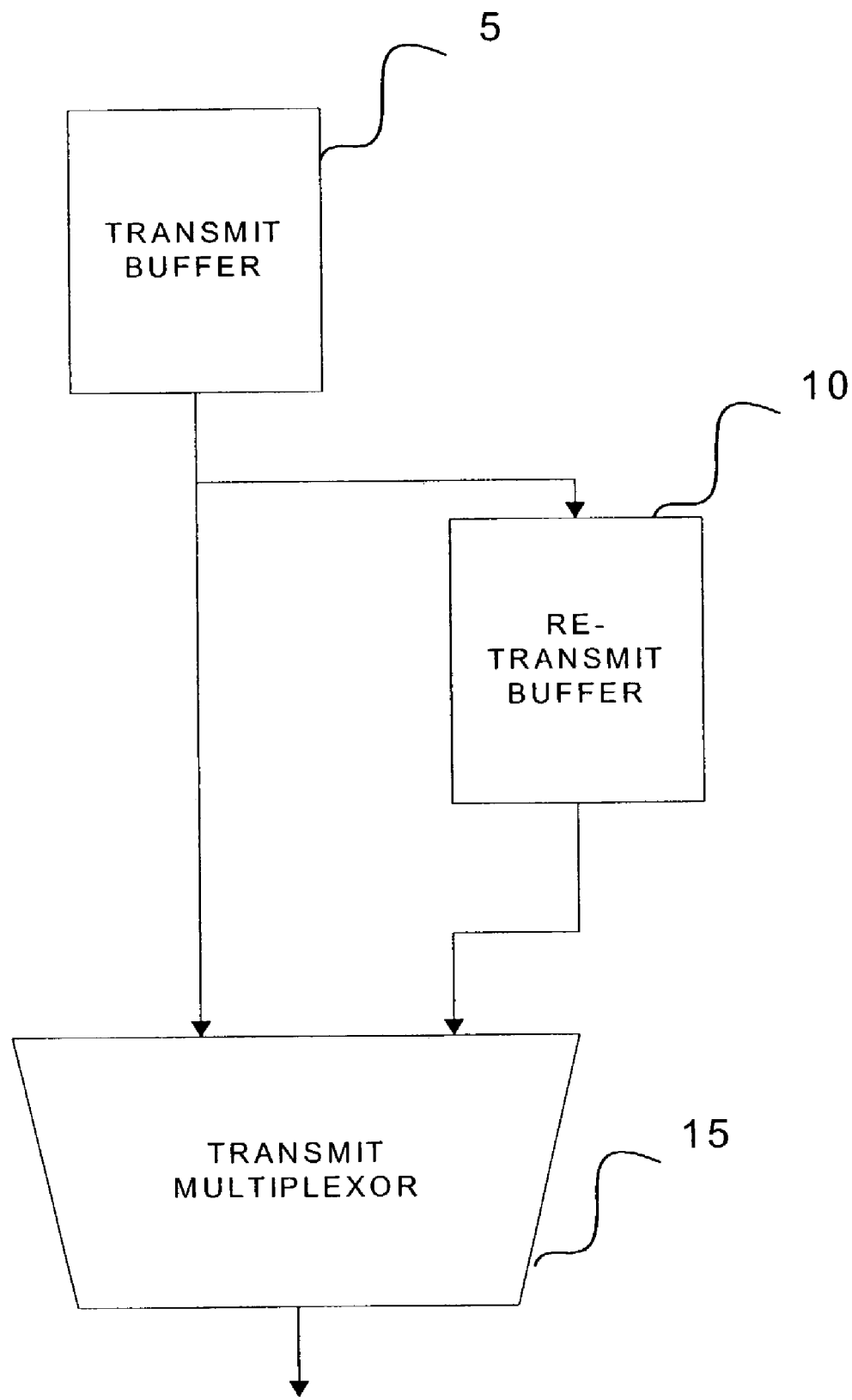
FIG. 1 is a block diagram for a prior art approach to storing data awaiting transmission to a network.
Figure 2:
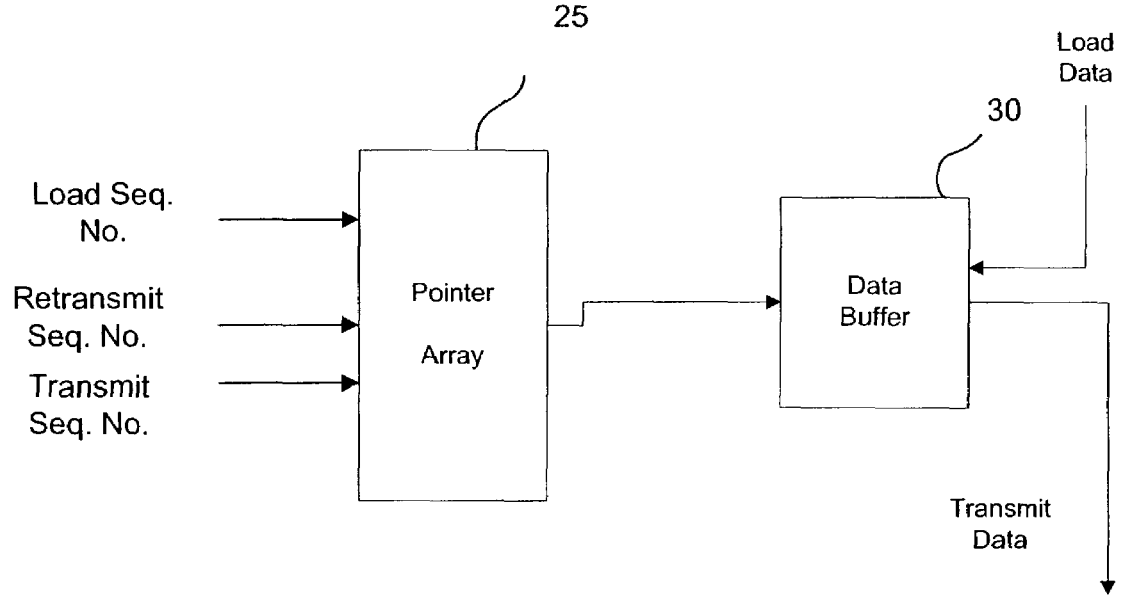
FIG. 2 shows a data storage structure for packets awaiting transmission to a network according to an embodiment of the present invention.

FIG. 2 shows data structures 20 for storing data packets waiting to be transmitted or retransmitted to a network according to an embodiment of the invention. Data buffer 30 stores the data packets in memory locations. The data buffer is organized as a circular FIFO queue. A pointer array 25, which may also be managed as a circular queue, contains address entries, each address corresponding to the start of a packet in data buffer 30. The pointer array is in turn indexed by the load sequence number, the retransmit sequence number and the transmit sequence number. The load sequence number corresponds to a pointer to the address immediately following the packet at the tail of the data buffer queue. The retransmit sequence number corresponds to a pointer to the start of the packet at the head of the data buffer queue. The transmit sequence number corresponds to the point in the data buffer from which the next packet to be transmitted will be read. The pointers in array 25 corresponding to these three sequence numbers provide address information needed to control the data buffer queue and transmission process. In the following description and in any appended claims, the pointer array entry corresponding to the load sequence number will be called the load pointer, the pointer array entry corresponding to the retransmit sequence number will be called the retransmit pointer and the pointer array entry corresponding to the transmit sequence number will be called the transmit pointer.

Figure 3:
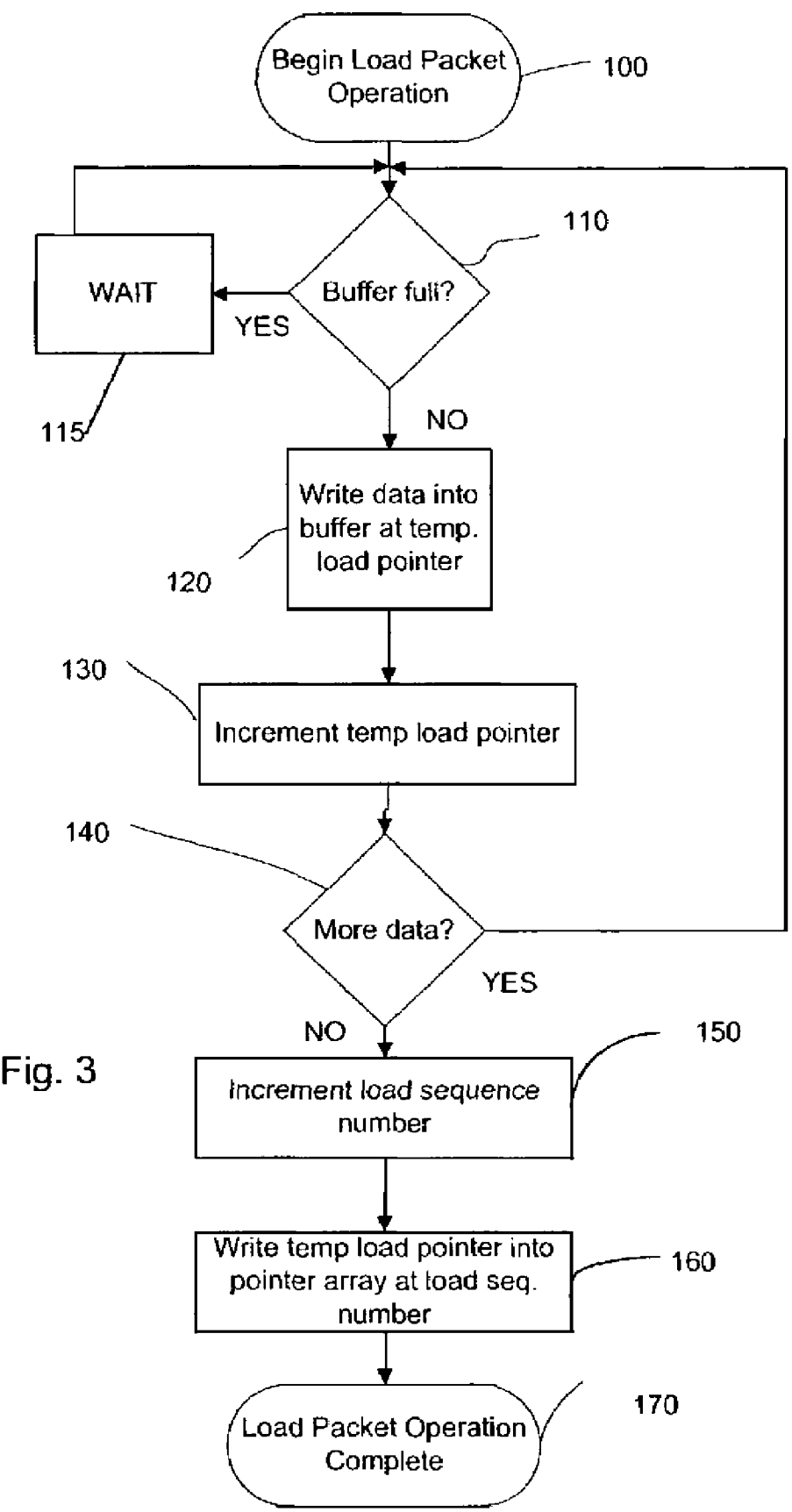
FIG. 3 is a flow chart illustrating the load data operation.

FIG. 3 illustrates adding 100 a packet to be transmitted to the data buffer. When a packet is ready for transmission, it is first determined 110 if the data buffer is full. A temporary load pointer is set equal to the load pointer and is compared to the retransmit pointer. The retransmit pointer points to the address of the head of the data buffer queue. If the temporary load pointer and the retransmit pointer are equal, the buffer is full and the process waits 115 until data buffer space becomes available, as described below. If the temporary load pointer and the retransmit pointer are unequal, data is loaded into the data buffer at the address contained in the temporary load pointer 120 and the temporary load pointer is incremented 130. Loading of the data buffer continues and the temporary load pointer continues to increase until the full packet is loaded. When loading of the packet is complete 140, the load sequence number is incremented 150 and the pointer array entry at the load sequence number is written 160 with the contents of the temporary load pointer. Thus, the pointer array address entry at the load sequence number will be the address of the end of the last packet loaded plus one, i.e. the start of the next packet to be loaded. Otherwise, if the buffer is full 110, the process waits until space is available and packet loading continues until complete 170. Note that the use of the pointer array to address the data buffer allows variable length packets to be accommodated. Further, the agent loading data into the data buffer needs only compare the temporary load pointer with the retransmit pointer to determine if the data buffer is full.

Figure 4:
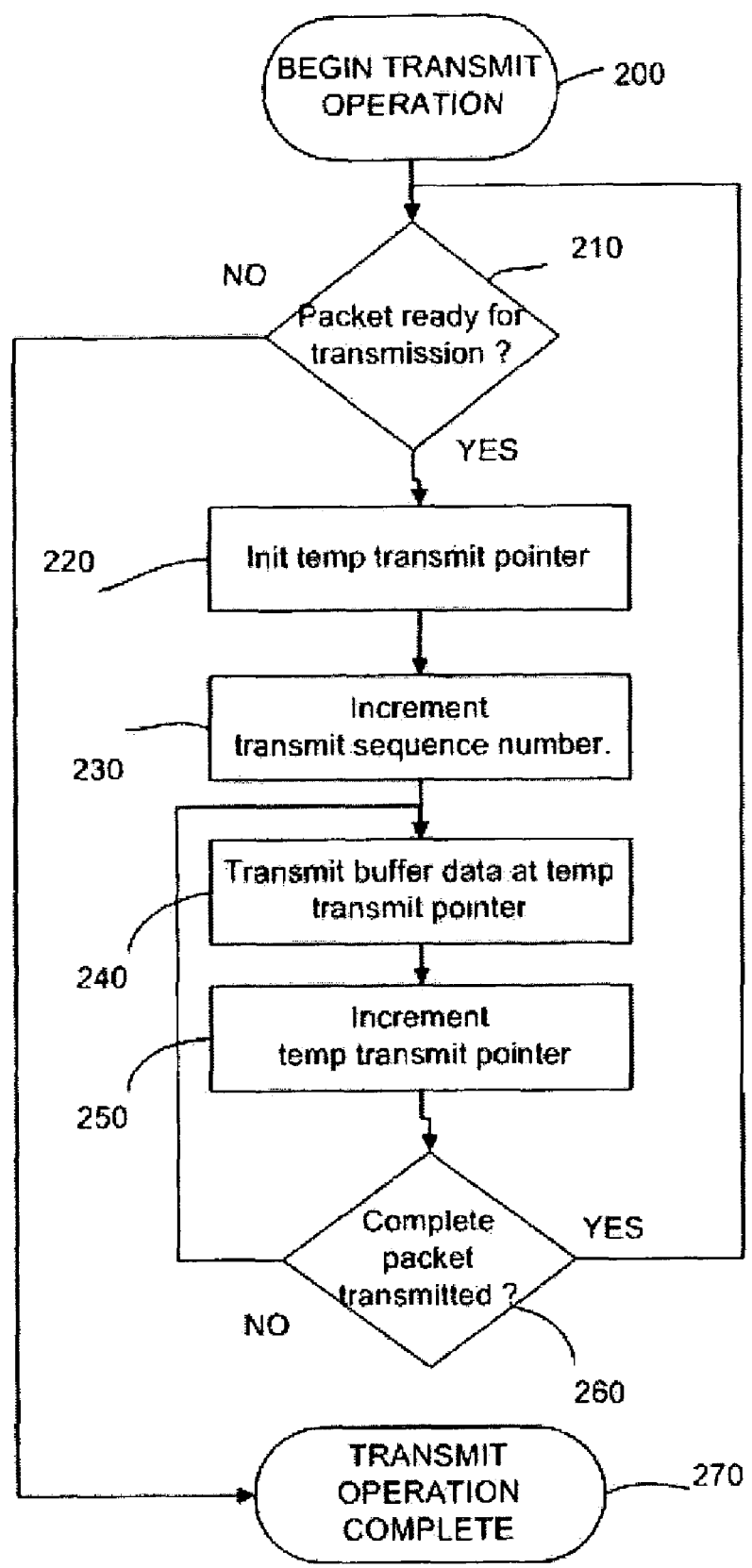
FIG. 4 is a flow chart illustrating the transmit data operation.

FIG. 4 illustrates the transmit data operation 200. When the network is ready for packet transmission, the transmit sequence number is compared 210 to the load sequence number. If the transmit sequence number is less than the load sequence number, a packet is ready for transmission. A temporary transmit pointer is loaded 220 with the address entry of the transmit pointer and data is transmitted 240 from the data buffer address at the address contained in the temporary transmit pointer. The transmit sequence number is incremented 230. The temporary transmit pointer is incremented after each data transmission 250 and compared to the current transmit pointer, which is the address entry pointing to the start of the next packet to be transmitted. When these two pointers are equal, packet transmission is complete 260. If no packet is ready for transmission, the transmit operation completes 270.

Figure 5:
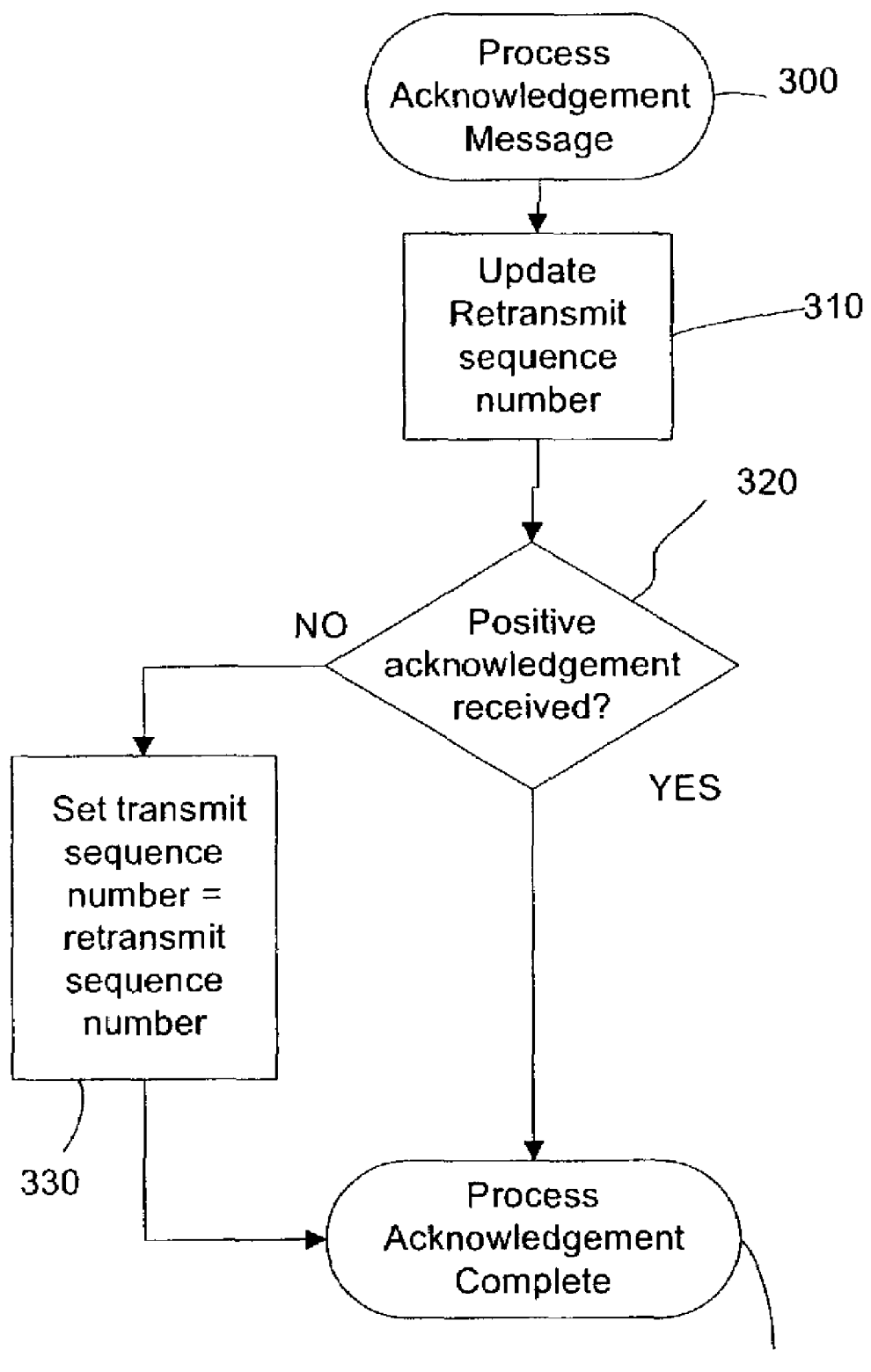
FIG. 5 is a flow chart illustrating the process flow when an acknowledgement message is received.

FIG. 5 illustrates processing an acknowledgement message received from the network 300. The retransmit sequence number is updated 310 to equal the last packet positively acknowledged plus one. If a positive acknowledgement is received indicating that transmitted packet(s) have been received correctly, the operation then completes 340. Space in the buffer for the packet(s) acknowledged is thereby freed. If a "negative acknowledgement" is received, indicating that a transmitted packet has been received incorrectly or a transmitted packet has been lost, the transmit sequence number is reset 330 to equal the retransmit sequence number and the operation completes 340. At the next transmission opportunity, the packet at the head of the data buffer queue, which corresponds to the retransmit sequence number, will be retransmitted. Transmission of succeeding packets continues as described above.

This embodiment of the invention reduces the error rate in packet transmission and reception and provides for variable length packets through use of the pointer array. Further, flow control on data transmission can be effected by allowing the data buffer to fill, when the receiver is unable to receive more packets. This is accomplished by stopping packet acknowledgements. This method also allows an agent charged with loading data to be transmitted to view the data buffer as a FIFO with the temporary load pointer and the retransmit pointer indicating whether space is available in the buffer to load additional data. Similarly, the agent charged with transmitting data to the network need only check whether the transmit sequence number and the load sequence number are unequal to determine if data is ready for transmission to the network. The data loading and transmitting processes are thereby advantageously decoupled. While the above embodiment has been described in terms of a network environment, embodiments of the invention where a non-networked communication link connect transmitter and receiver, such as a point-to-point link, are within the scope of the invention.

A device, in accordance with an embodiment of the invention, is provided for managing the buffers used for transmitting data packets to a network. This device includes a data buffer 30 used as a FIFO queue for packets and a pointer array 25 for addressing the stored packets, as shown in FIG. 2. The data buffer is organized as a circular FIFO queue. The pointer array 25 addresses data buffer 30 and is in turn indexed by the three sequence numbers: the load sequence number, the retransmit sequence number and the transmit sequence number. The pointer array is also managed as a circular queue. The device further includes logic for loading packets into the data buffer that effects the steps shown in FIG. 3, logic for transmitting packets that effects the steps shown in FIG. 4, and logic that processes acknowledgement messages, as shown in FIG. 5.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The present invention may be embodied in other specific forms without departing from the true scope of the invention. The described embodiments are to be considered in all respects only as illustrative and not restrictive.

What is claimed is:

1. A method for storing data packets for transmission over a communication link, the method comprising:
   providing a data buffer, the buffer including a plurality of memory locations;
   providing a pointer array containing a plurality of address entries, each for pointing to one of the memory locations in the data buffer;
   providing a load sequence indicator, a transmit sequence indicator and a retransmit sequence indicator, each indicator indicating one of the pointer array address entries; and
   loading a first packet into the data buffer at the address contained in the pointer array entry identified by the load sequence indicator, when space is available in the data buffer;
   wherein the method further includes transmitting a given packet from the data buffer at the address contained in the pointer array entry identified by the transmit sequence indicator, when the transmit sequence indicator does not equal the load sequence indicator and setting the transmit sequence indicator to indicate the pointer array entry immediately following the entry for the transmitted given packet.

2. A method according to claim 1 wherein loading a packet further includes comparing the address of the next location in the buffer to be loaded to the pointer array entry identified by the retransmit sequence number to determine if space is available in the data buffer.

3. A method according to claim 1 further including receiving an acknowledgement, the acknowledgement identifying a received packet and setting the transmit sequence indicator to correspond to the retransmit sequence indicator when the acknowledgement contains a negative acknowledgement.

4. A method according to claim 1, further including receiving an acknowledgement, the acknowledgement identifying a received packet, and setting the retransmit sequence indicator to correspond to the pointer array entry immediately following the entry for the received packet when the acknowledgement contains a positive acknowledgement.

5. A method for managing transmissions of data packets over a communication link, the method comprising:
   loading the data packets into a data buffer; loading address entries sequentially into a pointer array, each address entry associated with one of the data packets;
   setting a transmit sequence indicator to indicate an address entry for a packet to be transmitted;
   setting a retransmit sequence indicator to indicate the address entry of the earliest transmitted packet awaiting acknowledgement; and
   changing the transmit sequence indicator to equal the retransmit sequence indicator upon receiving a negative acknowledgement;
   wherein the method further comprises providing a load sequence indicator and loading a packet into the data buffer beginning at the pointer array address entry indicated by the load sequence indicator: and
   wherein loading a packet further includes comparing the address of the next location in the buffer to be loaded to the pointer array entry identified by the retransmit sequence number to determine if space is available in the data buffer.

6. A method according to claim 5, further including transmitting a given packet from the data buffer at the address contained in the pointer array entry identified by the transmit sequence indicator, when the transmit sequence indicator does not equal the load sequence indicator and setting the transmit sequence indicator to indicate the pointer array entry immediately following the entry for the transmitted given packet.

7. A computer program product for use on a computer system for storing data packets for transmission over a communication link, the system including a data buffer, the buffer including a plurality of memory locations and a pointer array pointing to the data buffer, the array containing a plurality of address entries, the system further including a load sequence indicator, a transmit sequence indicator and a retransmit sequence indicator, each indicator indexing pointer array address entries, the computer program product comprising a computer usable medium having computer readable program code thereon, the computer readable program code including instructions that, when executed, cause the computer system to:
   load a first packet into the data buffer at the address contained in the pointer array entry identified by the load sequence indicator, when space is available in the data buffer;
   transmit a given packet from the data buffer at the address contained in the pointer array entry identified by the transmit sequence indicator when the transmit sequence indicator does not equal the load sequence indicator; and
   compare the address of the next location in the buffer to be loaded to the pointer array entry identified by the retransmit sequence number to determine if space is available in the data buffer.

8. A computer program product according to claim 7, further including program code including instructions that, when executed, cause the computer system to receive an acknowledgement, the acknowledgement identifying a received packets and further cause the computer system to set the transmit sequence indicator to correspond to the retransmit sequence indicator, when the acknowledgement contains a negative acknowledgement.

9. A computer program product according to claim 7, further including program code including instructions that, when executed, cause the computer system to receive an acknowledgement, the acknowledgement identifying a received packet, and further cause the computer system to set the retransmit sequence indicator to correspond to packet after the received packet when the acknowledgement contains a positive acknowledgement.

10. A device configured to store packets for transmission over a communication link, the device comprising:
    a data buffer, the buffer including a plurality of memory locations;
    a pointer array pointing to the data buffer, the array configured to store a plurality of address entries;
    a load sequence indicator, a transmit sequence indicator and a retransmit sequence indicator, each indicator indexing pointer array address entries;
    logic configured to load a first packet into the data buffer at the address contained in the pointer array entry identified by the load sequence indicator, when space is available in the data buffer;
    logic configured to load a given packet from the data buffer at the address contained in the pointer array entry identified by the transmit sequence indicator, when the transmit sequence indicator does not equal the load sequence indicator; and
    logic configured to compare the address of the next location in the buffer to be loaded to the pointer array entry identified by the retransmit sequence number to determine if space is available in the data buffer.

11. A device according to claim 10 further including logic coupled to receive an acknowledgement, the acknowledgement identifying a received packet and to set the transmit sequence indicator to correspond to the retransmit sequence indicator when the acknowledgement contains a negative acknowledgement.

12. A device according to claim 10 further including logic for coupled to receive an acknowledgement, the acknowledgement identifying a received packet, and to set the retransmit sequence indicator to correspond to packet after the received packet when the acknowledgement contains a positive acknowledgement.

13. A method for storing data packets for transmission over a communication link, the method comprising:
    providing a data buffer, the buffer including a plurality of memory locations;
    providing a pointer array containing a plurality of address entries, each for pointing to one of the memory locations in the data buffer;
    providing a load sequence indicator, a transmit sequence indicator and a retransmit sequence indicator, each indicator indicating one of the pointer array address entries; and
    loading a first packet into the data buffer at the address contained in the pointer array entry identified by the load sequence indicator, when space is available in the data buffer;
    wherein loading a packet further includes comparing the address of the next location in the buffer to be loaded to the pointer array entry identified by the retransmit sequence number to determine if space is available in the data buffer.

14. A method for managing transmissions of data packets over a communication link, the method comprising:
    loading the data packets into a data buffer;
    loading address entries sequentially into a pointer array, each address entry associated with one of the data packets;
    setting a transmit sequence indicator to indicate an address entry for a packet to be transmitted;
    setting a retransmit sequence indicator to indicate the address entry of the earliest transmitted packet awaiting acknowledgement; and
    changing the transmit sequence indicator to equal the retransmit sequence indicator upon receiving a negative acknowledgement;
    wherein the method further comprises:
    providing a load sequence indicator and loading a packet into the data buffer beginning at the pointer array address entry indicated by the load sequence indicator;
    transmitting a given packet from the data buffer at the address contained in the pointer array entry identified by the transmit sequence indicator, when the transmit sequence indicator does not equal the load sequence indicator; and
    setting the transmit sequence indicator to indicate the pointer array entry immediately following the entry for the transmitted given packet.

15. A computer program product for use on a computer system for storing data packets for transmission over a communication link, the system including a data buffer, the buffer including a plurality of memory locations and a pointer array pointing to the data buffer, the array containing a plurality of address entries, the system further including a load sequence indicator, a transmit sequence indicator and a retransmit sequence indicator, each indicator indexing pointer array address entries, the computer program product comprising:
    a computer usable medium having computer readable program code thereon, the computer readable program code including instructions that, when executed, cause the computer system to:
    load a first packet into the data buffer at the address contained in the pointer array entry identified by the load sequence indicator, when space is available in the data buffer;
    transmit a given packet from the data buffer at the address contained in the pointer array entry identified by the transmit sequence indicator, when the transmit sequence indicator does not equal the load sequence indicator;
    receive an acknowledgement, the acknowledgement identifying a received packet;
    set the transmit sequence indicator to correspond to the retransmit sequence indicator, when the acknowledgement contains a negative acknowledgement.

* * * * *